United States Patent
Cheng

(10) Patent No.: US 9,690,458 B2
(45) Date of Patent: Jun. 27, 2017

(54) IMAGE VIEWING METHOD FOR DISPLAYING PORTION OF SELECTED IMAGE BASED ON USER INTERACTION INPUT AND RELATED IMAGE VIEWING SYSTEM AND MACHINE READABLE MEDIUM

(71) Applicant: MEDIATEK INC., Hsin-Chu (TW)

(72) Inventor: Chia-Ming Cheng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 320 days.

(21) Appl. No.: 13/890,227

(22) Filed: May 8, 2013

(65) Prior Publication Data

US 2014/0075382 A1 Mar. 13, 2014

Related U.S. Application Data

(60) Provisional application No. 61/699,012, filed on Sep. 10, 2012.

(51) Int. Cl.
| | |
|---|---|
| G06F 3/048 | (2013.01) |
| G06F 3/0484 | (2013.01) |
| G06F 3/0481 | (2013.01) |
| G06F 3/0482 | (2013.01) |
| G06F 3/0346 | (2013.01) |

(52) U.S. Cl.
CPC ........ G06F 3/04842 (2013.01); G06F 3/0346 (2013.01); G06F 3/0482 (2013.01); G06F 3/04815 (2013.01); *G06F 2203/04806* (2013.01)

(58) Field of Classification Search
CPC ..................................................... G06F 3/048
See application file for complete search history.

(56) References Cited

U.S. PATENT DOCUMENTS

| 6,173,087 | B1 * | 1/2001 | Kumar et al. ............... 382/284 |
| 7,424,218 | B2 | 9/2008 | Baudisch |
| 7,805,066 | B2 | 9/2010 | Wexler |
| 7,920,161 | B2 | 4/2011 | Niemi |
| 8,009,178 | B2 | 8/2011 | Chen |
| 2004/0257384 | A1 * | 12/2004 | Park et al. .................... 345/646 |
| 2007/0038945 | A1 * | 2/2007 | Miller .................. G06F 3/0481 715/760 |
| 2007/0081081 | A1 | 4/2007 | Cheng |
| 2010/0066860 | A1 * | 3/2010 | Tsurumi .................... 348/231.2 |
| 2010/0171810 | A1 * | 7/2010 | Ohki .............................. 348/36 |

(Continued)

FOREIGN PATENT DOCUMENTS

| CN | 101986242 A | 3/2011 |
| CN | 102307309 A | 1/2012 |

*Primary Examiner* — Xuyang Xia
(74) *Attorney, Agent, or Firm* — Winston Hsu

(57) ABSTRACT

An image viewing method includes: determining at least a first partial image corresponding to a portion of a first image directly selected from a plurality of images, and driving a display apparatus according to the first partial image; in accordance with a user interaction input, determining a second partial image corresponding to a portion of a second image directly selected from the images; and driving the display apparatus according to at least the second partial image. In one implementation, the first image and the second image are spatially correlated, and a field of view (FOV) of each of the first image and the second image is larger than an FOV of the display apparatus.

26 Claims, 6 Drawing Sheets

(56) References Cited

U.S. PATENT DOCUMENTS

2011/0268369 A1    11/2011  Richards
2012/0237082 A1*    9/2012  Sengupta ........... G06K 9/00771
                                                382/103
2012/0307096 A1*   12/2012  Ford ................. H04N 5/23219
                                                348/222.1
2013/0335446 A1*   12/2013  Piippo ................ G06F 3/04815
                                                345/633

* cited by examiner

IMAGE VIEWING METHOD FOR DISPLAYING PORTION OF SELECTED IMAGE BASED ON USER INTERACTION INPUT AND RELATED IMAGE VIEWING SYSTEM AND MACHINE READABLE MEDIUM

CROSS REFERENCE TO RELATED APPLICATIONS

This application claims the benefit of U.S. provisional application No. 61/699,012, filed on Sep. 10, 2012 and incorporated herein by reference.

BACKGROUND

The disclosed embodiments of the present invention relate to displaying contents of images, and more particularly, to an image viewing method for displaying a portion of a selected image based on a user interaction input and related image viewing system and machine readable medium thereof.

A user may use an image capture apparatus (e.g., a digital camera module of a mobile device) to capture a series of input images. One conventional method may combine multiple input images into one single image, and then display part or all of image contents of the single image to the user. However, the image combination process would lose a lot of original information of the input images. For example, the photometry information (e.g., exposure, luminance and color), the geometry information (e.g., occlusion regions, and geometric deformation due to different viewpoints), and moving objects (e.g. foreground pedestrians and/or vehicles) of certain input images may be lost. Besides, the image combination process may introduce undesired geometric and photometric artifacts. Further, as combining multiple input images into one single image requires complicated computations, the image combination process is time consuming and is not suitable for a mobile device with insufficient computing power.

Thus, there is a need for a novel quick image viewer which is capable of preserving all the information of the input images and introducing no stitching artifact.

SUMMARY

In accordance with exemplary embodiments of the present invention, an image viewing method for displaying a portion of a selected image based on a user interaction input and related image viewing system and machine readable medium thereof are proposed to solve the above-mentioned problems.

According to a first aspect of the present invention, an exemplary image viewing method includes: determining at least a first partial image corresponding to a portion of a first image directly selected from a plurality of images, and driving a display apparatus according to the first partial image ; in accordance with a user interaction input, determining a second partial image corresponding to a portion of an image directly selected from the plurality of images; and driving the display apparatus according to at least the second partial image. The first partial image and the second partial image are spatially correlated; and a field of view (FOV) of each of the plurality of input images is larger than an FOV of the display apparatus.

According to a second aspect of the present invention, an exemplary image viewing system includes a user input receiving unit, an image selection unit, an image cropping unit, and an output unit. The output unit is arranged for driving a display apparatus according to a first partial image corresponding to a portion of a first image directly selected from a plurality of images. The user input receiving unit is arranged for receiving a user interaction input. The image selection unit is arranged for directly selecting a second image from the images according to the user interaction input. The image cropping unit is arranged for determining a second partial image corresponding to a portion of the same or a second image according to the user interaction input. The output unit is further arranged for driving the display apparatus according to at least the second partial image. The first image and the second image are spatially correlated, and a field of view (FOV) of each of the input image is larger than an FOV of the display apparatus.

According to a third aspect of the present invention, a machine readable medium is disclosed. The machine readable medium stores a program code. When executed by a processor, the program code instructs the processor to perform the following steps: determining at least a first partial image corresponding to a portion of a first image directly selected from a plurality of images, and displaying the first partial image on a display apparatus; in accordance with a user interaction input, determining a second partial image corresponding to a portion of a second image directly selected from the images; and driving the display apparatus according to at least the second partial image. The first image and the second image are spatially correlated, and a field of view (FOV) of each of the first image and the second image is larger than an FOV of the display apparatus.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to explore multi-image datasets without merging/combining the input images. For instance, all of the information of the input images is preserved, and a local region is cropped from an image selected from the input images according to user interaction. In this way, a quick image viewer may be realized due to omission of the conventional image combination process. To put it simply, the proposed image viewing technique may be employed in a variety of applications, including a quick 2D/3D viewer on a mobile device (e.g., a cellular phone), 2D/3D multi-angle view (MAV) in panorama, user interactive 2D/3D panorama, user interactive high dynamic range (HDR) panorama, and stereoscopic visual effect. Further details of the proposed image viewing technique are described as below.

Figure 1:
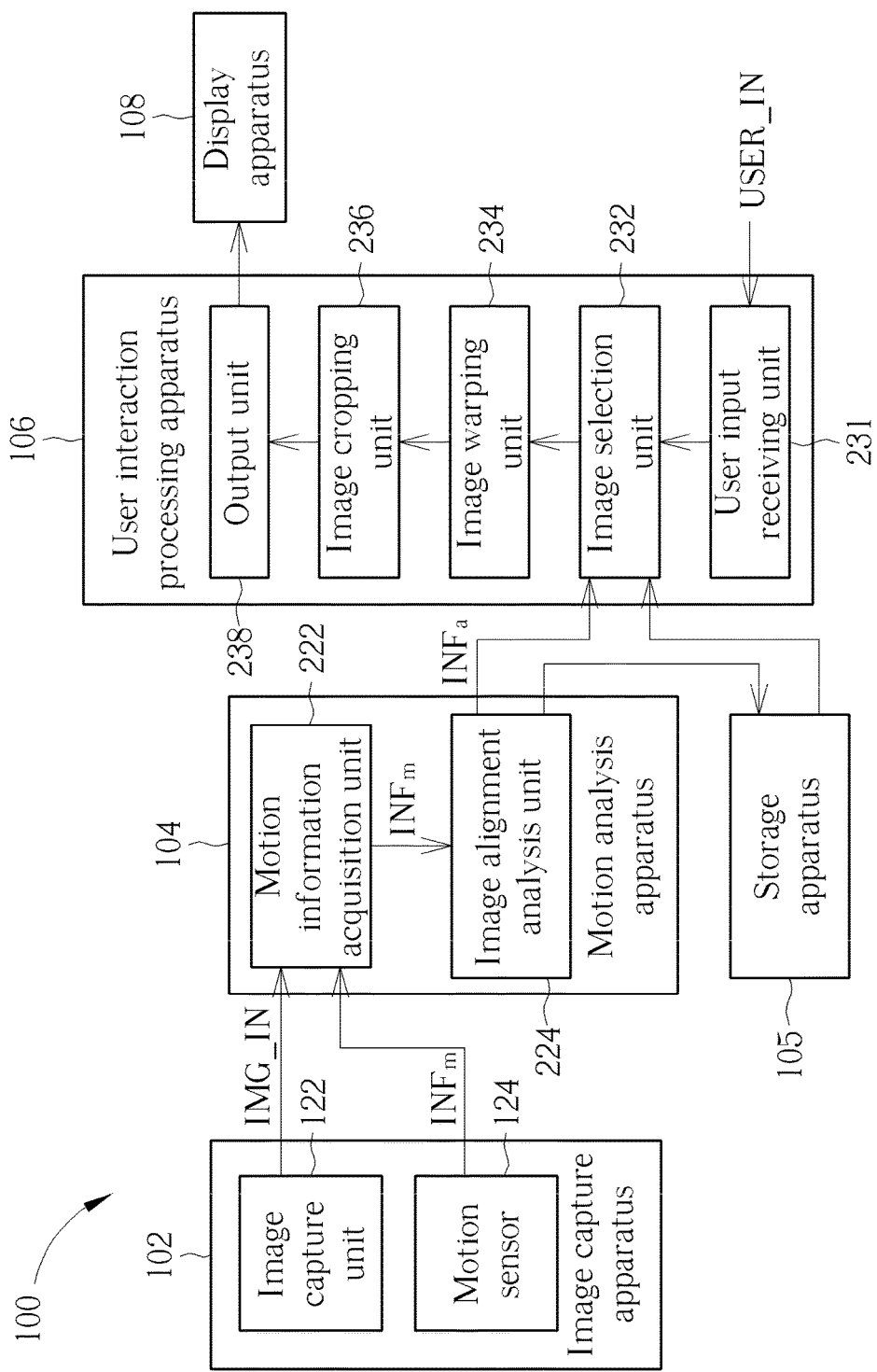
FIG. 1 is a block diagram illustrating an image viewing system according to a first embodiment of the present invention.

FIG. 1 is a block diagram illustrating an image viewing system according to a first embodiment of the present invention. The image viewing system 100 may be implemented in a mobile device such as a cellular phone. However, this is not meant to be a limitation of the present invention. That is, any device which uses the proposed image viewing technique capable of preserving all the information of input images and introducing no stitching artifact falls within the scope of the present invention. As shown in FIG. 1, the image viewing system 100 includes, but not limited to, an image capture apparatus 102, a motion analysis apparatus 104, a storage apparatus 105, a user interaction processing apparatus 106, and a display apparatus 108. The image capture apparatus 102 is used to generate a plurality of input images IMG_IN, and includes an image capture unit 122 and an optional motion sensor 124. In one implementation, the image capture unit 122 is a single-sensor camera used by a user to capture a plurality of images as the input images IMG_IN according to a random capture manner or a guided capture manner (e.g., a hand-held sweep motion mode, or a painting mode with preview guidance). For example, the user moves a mobile device (e.g., a cellular phone) where the image capture unit 122 is located and uses the image capture unit 122 to capture the input images IMG_IN at different time points respectively. In another implementation, the image capture unit 122 is a multi-sensor camera (e.g., a stereo camera system or a camera array system) used by a user to capture a plurality of images as the input images IMG_IN. For example, the user moves a mobile device (e.g., a cellular phone) where the image capture unit 122 is located and uses the image capture unit 122 to simultaneously capture multiple images many times, thus obtaining the input images IMG_IN.

Please note that the motion sensor 124 may be an optional component. In a case where the motion sensor 124 is implemented, an output of the motion sensor 124 provides the motion information $INF_m$ of the input images IMG_IN. In other words, the motion status associated with each captured image is indicated by the output of the motion sensor 124. Thus, the motion information $INF_m$ provided by the motion sensor 124 may be directly used by the following image processing stage, thus saving additional motion estimation efforts.

The motion analysis apparatus 104 includes a motion information acquisition unit 222 and an image alignment analysis unit 224. In a case where the motion sensor 124 is implemented, the motion information acquisition unit 222 receives the output of the motion sensor 124 located at the image capture apparatus 102 which generates the input images IMG_IN, and thus obtains the motion information $INF_m$ needed by the image alignment analysis unit 224. In another case where the motion sensor 124 is omitted from the image capture apparatus 102, the motion information acquisition unit 222 is arranged for performing a three-dimensional (3D) motion analysis upon the input images IMG_IN to thereby obtain the motion information $INF_m$ needed by the image alignment analysis unit 224.

As the input images are captured at different viewing angles due to movement of a single image sensor on the image capture apparatus 102 and/or multiple image sensors on the same the image capture apparatus 102, the image alignment analysis unit 224 in this embodiment is therefore implemented for performing an image alignment analysis upon the input images IMG_IN to obtain image alignment information $INF_a$. The motion information $INF_m$ indicates the difference between input images IMG_IN. By way of example, the image alignment analysis unit 224 is arranged to perform a local image alignment analysis by using an object-based alignment algorithm or a feature extraction and matching algorithm with reference to the motion information $INF_m$. As the alignment information associated with each local image area within one input image is obtained by the local image alignment analysis, the following image processing stage is thus allowed to employ a local image processing scheme to achieve better visual quality. For example, a local image warping operation may be performed in accordance with the image alignment information $INF_a$ which carries the local image alignment analysis result.

In this embodiment, the storage apparatus 105 is used to store the image information (i.e., the input images IMG_IN) and the auxiliary information (e.g., the image alignment information $INF_a$). By way of example, a multi-picture object (MPO) container may be used to store multiple images and respective auxiliary information. However, this is for illustrative purposes only, and is not meant to be a limitation of the present invention.

In this embodiment of the present invention, the user interaction processing apparatus 106 is the kernel part of the proposed user interactive multi-image quick viewer which does not merge/combine the input images IMG_IN into one single image. As shown in FIG. 1, the user interaction processing apparatus 106 includes a user input receiving unit 231, an image selection unit 232, an image warping unit 234, an image cropping unit 236, and an output unit 238. The user input receiving 231 is arranged for receiving a user interaction input USER_IN. Assuming that the image viewing system 100 is implemented in a smartphone, the user interaction input USER_IN may be generated in response to user's finger(s) or a stylus interacting with a touch panel, or may be generated in response to movement/rotation of the motion sensor 124 resulting from the user moving/rotating the smartphone.

As the present invention does not merge/combine the input images IMG_IN into one single image and a field of view (FOV) of each input image is larger than an FOV of the display apparatus 108 (e.g., an image resolution of each input image (e.g., 2M, 3M, 5M, 8M, 12M, or above) is higher than a display resolution of the display apparatus 108 (e.g., VGA, 480P, 540P, 720P, or even 1080P)), an image selection/swapping operation is needed to determine which one of the input images IMG_IN should be used, and an image cropping operation is needed to extract a partial image corresponding to a selected local region from the selected input image. Besides, an image warping operation may also be performed to optimize the visual quality. In this embodiment, the image selection unit 232 is responsible for performing the image selection/swapping operation, the image cropping unit 236 is responsible for performing the image cropping operation, and the image warping unit 234 is responsible for performing the image warping operation.

Figure 2:
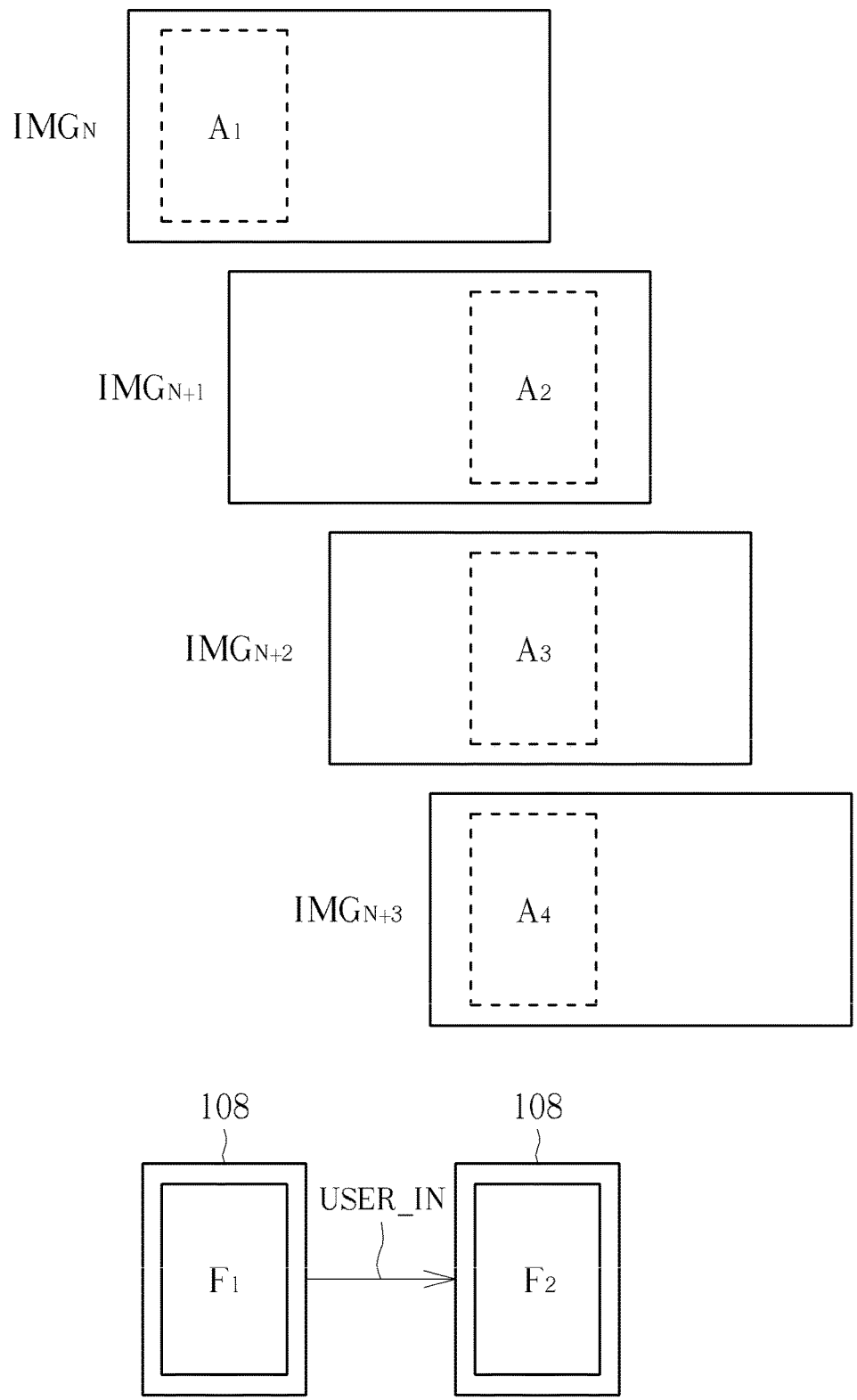
FIG. 2 is a diagram illustrating an example of the image selection/swapping operation performed by an image selection unit according to the present invention.

Please refer to FIG. 2, which is a diagram illustrating an example of the image selection/swapping operation performed by the image selection unit 232. In the beginning, the image selection unit 232 automatically selects one of the input images IMG_IN as a default image without user intervention. In one embodiment, the first one of the input images IMG_IN may be selected as the default image to be initially displayed; and in another embodiment, the middle one of the input images IMG_IN may be selected as the default image to be initially displayed. That is, any input image may be selected as the default image, depending upon actual design requirement/consideration. Suppose that the input image $IMG_N$ shown in FIG. 2 is initially selected as the default image. As can be seen from FIG. 2, the following successive input images $IMG_{N+1}$, $IMG_{N+2}$, $IMG_{N+3}$ are spatially correlated with the input image $IMG_N$. To put it another way, the input images $IMG_N$, $IMG_{N+1}$, $IMG_{N+2}$, $IMG_{N+3}$ are captured from scenes that are spatially overlapped with each other. Besides, a local region may also be initially selected/cropped from the default image (i.e., the input image $IMG_N$) without user intervention. In this embodiment, a portion $A_1$ of the input image $IMG_N$ is selected such that a partial image $F_1$ corresponding to the portion $A_1$ of the input image $IMG_N$ is displayed on a display screen of the display apparatus 108.

When a user wants to view a different local region of the captured high-resolution input images IMG_IN on a low-resolution display screen, the user may move the finger/stylus to control the image selection. It should be noted that each of captured input images IMG_IN has an original FOV, a partial image corresponding to the selected local region has an FOV smaller than the original FOV, and the original FOV of each input image is larger than the FOV of the display screen. As shown in FIG. 2, the user moves the finger/stylus rightwards, and the corresponding user interaction input USER_IN is received by the user input receiving unit 231. To achieve visual optimization, the image selection unit 232 may employ a selection strategy to determine a selected input image in response to the user interaction. In one exemplary design, the employed selection strategy focuses on minimizing the frequency of image swapping according to the image geometry. Hence, the image selection unit 232 finds a plurality of candidate images from the input images IMG_IN according to the user interaction input USER_IN and the image alignment information $INF_a$, where a current image and the candidate images are spatially correlated as indicated by the image alignment information $INF_a$, and each of the candidate images has a candidate portion corresponding to the user interaction input USER_IN. Next, the image selection unit 232 refers to positions of candidate portions of the candidate images to select one of the candidate images as a selected image. Regarding the example shown in FIG. 2, the input images $IMG_{N+1}$-$IMG_{N+3}$ are determined as the candidate images since these input images $IMG_{N+1}$-$IMG_{N+3}$ have candidate portions $A_2$, $A_3$, $A_4$ pointed to by the user interaction input USER_IN. The positions of the candidate portions $A_2$, $A_3$, $A_4$ are checked to determine which one of the input images $IMG_{N+1}$-$IMG_{N+3}$ is capable of minimizing the frequency of image swapping. Specifically, a candidate image with a candidate portion closest to an image center is selected by the image selection unit 232 due to the fact that such a selected candidate image would have a balanced distribution of local regions located at both sides of a selected candidate portion. Therefore, as can be seen from FIG. 2, the input image $IMG_{N+2}$ will be selected by the image selection unit 232 according to this selection strategy, and a partial image F2 corresponding to the selected portion $A_3$ of the input image $IMG_{N+2}$ is displayed on the display screen of the display apparatus 108.

In another exemplary design, the employed selection strategy focuses on minimizing the visual transition between image swapping according to the image similarity. Hence, the image selection unit 232 finds a plurality of candidate images from the input images IMG_IN according to the user interaction input USER_IN and the image alignment information $INF_a$, where a current image and the candidate images are spatially correlated as indicated by the image alignment information $INF_a$, and each of the candidate images has a candidate portion corresponding to the user interaction input. Next, the image selection unit 232 refers to differences between a current portion of the current image and candidate portions of the candidate images to select one of the candidate images as a selected image. Regarding the example shown in FIG. 2, the input images $IMG_{N+1}$-$IMG_{N+3}$ are determined as the candidate images since the input images $IMG_{N+1}$-$IMG_{N+3}$ have candidate portions $A_2$, $A_3$, $A_4$ pointed to by the user interaction input USER_IN. The differences between the portion Al of the input image $IMG_N$ and the portions $A_2$, $A_3$, $A_4$ of the input images $IMG_{N+1}$-$IMG_{N+3}$ are checked to determine which one of the input images $IMG_{N+1}$-$IMG_{N+}$3 is capable of minimizing the visual transition between image swapping. Specifically, a candidate image with a smallest difference between a candidate portion and the current portion of the current image is selected by the image selection unit 232 due to the fact that such a selected image has a selected portion which is most similar to the current portion of the current image. Assuming that the portion $A_2$ of the input image $IMG_{N+1}$ is most similar to the portion $A_1$ of the input image $IMG_N$, the input image $IMG_{N+1}$ will be selected by the image selection unit 232 according to this selection strategy, and a partial image F2 corresponding to the selected portion $A_2$ of the input image $IMG_{N+1}$ is displayed on the display screen of the display apparatus 108.

It should be noted that no image swapping/switching is needed when the image alignment information $INF_a$ indicates that a different local region requested by the user interaction input USER_IN is still within the current image (i.e., input image $IMG_N$). Hence, the image selection unit 232 would select the current image (i.e., input image $IMG_N$) in response to the user interaction input USER_IN.

In this embodiment, the image warping unit 234 is coupled between the image cropping unit and the image selection unit 232, and arranged for performing a local image warping operation (i.e., an online image warping operation) upon the selected candidate portion of the selected candidate image according to the image alignment information $INF_a$ obtained by local image alignment analysis, and accordingly generates a warped portion of the selected candidate image. Afterwards, the image cropping unit 236 determines a partial image according to the warped portion of the selected candidate image. It should be noted that the local image warping operation performed by the image warping unit 234 is capable of improving the visual quality.

Regarding the output unit 238, it is arranged for driving the display apparatus 108 to show a default partial image (e.g., $F_1$) that is initially determined or each partial image (e.g., $F_2$) that is dynamically determined in response to user interaction. In one implementation, the output unit 238 may render the cropped region by using a direct draw manner. In another implementation, the display apparatus 108 may render the cropped region by using a dual buffering technique, thus predicting and pre-loading the swapped image candidate according to the user interaction trend. In this way, the efficiency of rendering the cropped region is improved.

Figure 3:
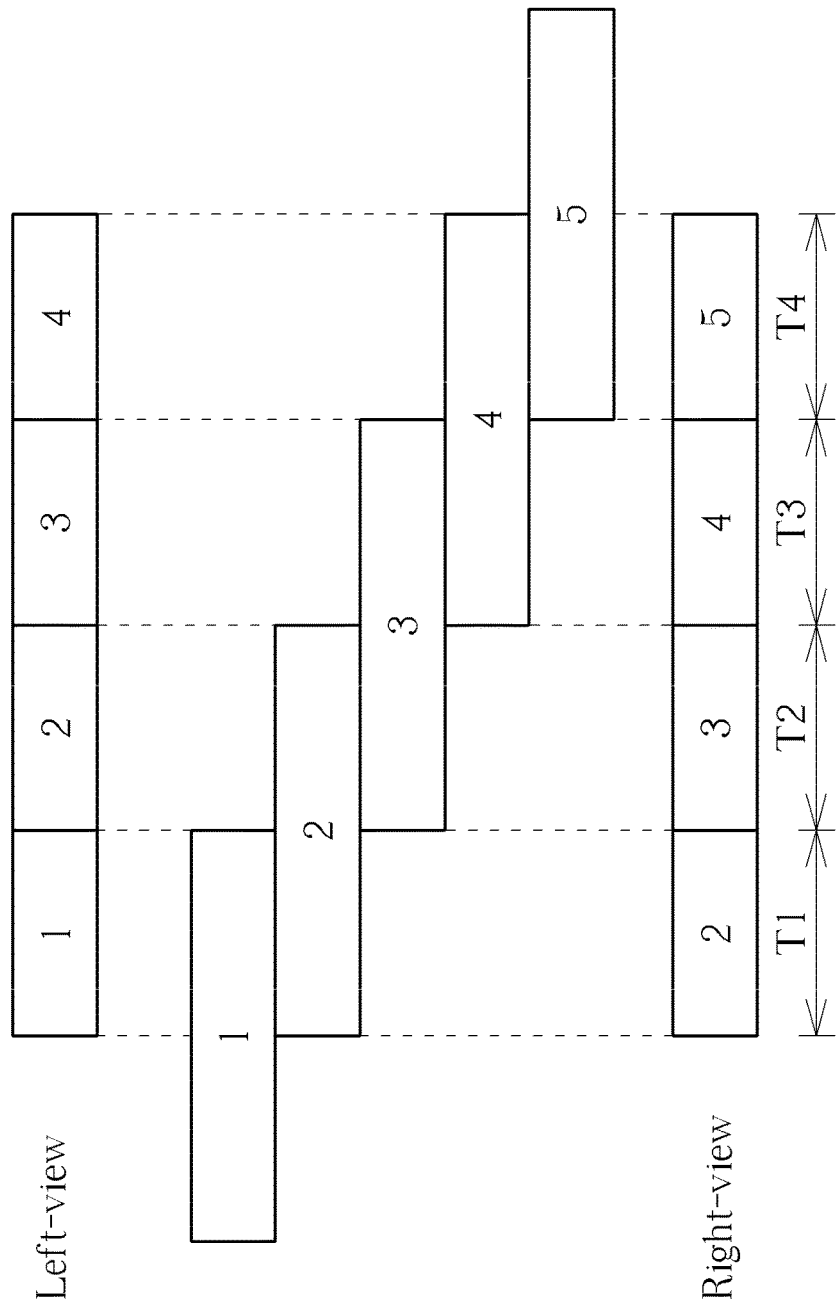
FIG. 3 is a diagram illustrating the concept of a stereoscopic quick viewer according to an embodiment of the present invention.

In addition to a two-dimensional (2D) playback application, the image viewing system 100 may support a three-dimensional (3D) playback application. In other words, the display apparatus 108 may be equipped with a 3D display panel for presenting a left-view partial image derived from one input image directly selected from the input images IMG_IN and a right-view partial image derived from another input image directly selected from the input images IMG_IN. Please refer to FIG. 3, which is a diagram illustrating the concept of a stereoscopic quick viewer according to an embodiment of the present invention. Assume that five input images $IMG_1$-$IMG_5$ with index values 1-5 are sequentially generated by moving the image capture apparatus 102. In a first time period T1, an image pair, including the input image $IMG_1$ as a left-view image and the input image $IMG_2$ as a right-view image, is displayed for 3D playback; in a second time period T2, an image pair, including the input image $IMG_2$ as a left-view image and the input image $IMG_3$ as a right-view image, is displayed for 3D playback; in a third time period T3, an image pair, including the input image $IMG_3$ as a left-view image and the input image $IMG_4$ as a right-view image, is displayed for 3D playback; and in a fourth time period T4, an image pair, including the input image $IMG_4$ as a left-view image and the input image $IMG_5$ as a right-view image, is displayed for 3D playback. The disparity (horizontal pixel difference) of the same object in the input images $IMG_1$ & $IMG_2$ would create the depth perception of the object when displayed. Similarly, the disparity (horizontal pixel difference) of the same object in the input images $IMG_2$ & $IMG_3$ would create the depth perception of the object when displayed; the disparity (horizontal pixel difference) of the same object in the input images $IMG_3$ & $IMG_4$ would create the depth perception of the object when displayed; and the disparity (horizontal pixel difference) of the same object in the input images $IMG_4$ & $IMG_5$ would create the depth perception of the object when displayed. Thus, regarding the 3D playback application, the image selection unit 232 would select two input images (which may be captured by a single image sensor at different time points or captured by two image sensors at the same time) for allowing the image cropping unit 236 to obtain one partial image from one selected input image as a left-view image and obtain another partial image from the other selected input image as a right-view image. As the principle of the image selection operation associated with either of the right-view image and the right-view image is similar to that of the example illustrated in FIG. 2, further description is omitted here for brevity.

It should be noted that the distance between the selected images within the input images IMG_IN may affect the disparity setting of the left-view image and the right-view image. Thus, when referring to the user interaction input USER_IN to determine two input images referenced for setting the right-view image and the left-view image, the image selection unit 232 may further refer to the disparity characteristic to refine the image selection such that the final selection of two input images would make the right-view image and the left-view image have the desired disparity setting (e.g., unchanged disparity, reduced disparity, or increased disparity), where the disparity information needed may be obtained during the image alignment analysis process. Further details are described as below.

By way of example, the user interactive control may include image translation, 3D push forward into screen/pull in out of screen, and zoom in/zoom out with disparity control. In one exemplary embodiment, the translation is controlled by user's touch-and-drag action upon a touch panel, the 3D push forward into screen/pull in out of screen is controlled by user's two-finger touch-and-drag up/down action upon the touch panel, and the zoom in/zoom out with disparity control is controlled by user's one-finger touch and move up/down action upon the touch panel. In another exemplary embodiment, the translation is controlled by rotating the mobile device (where the motion sensor 124 is located), the 3D push forward into screen/pull in out of screen is controlled by moving the mobile device (where the motion sensor 124 is located) forward/backward, and the zoom in/zoom out with disparity control is controlled by user's one-finger touch and move up/down action upon a touch panel.

The aforementioned translation and 3D push forward into screen/pull in out of screen do not include any image scaling, while the zoom in/zoom out with disparity control would perform image scaling. When the user interaction input USER_IN is to control the image translation for the 3D playback, the user interaction processing apparatus 106 simply changes one selection of two input images to another selection of two input images. For example, referring to FIG. 3, when the input images $IMG_1$ and $IMG_2$ are currently used for setting the left-view image and the right-view image for 3D playback, the input images $IMG_3$ and $IMG_4$ may be selected due to the user interaction input USER_IN and thus used for setting the left-view image and the right-view image for 3D playback. When the user interaction input USER_IN is to control the 3D push forward into screen/pull in out of screen, the user interaction processing apparatus 106 replaces one input image included in the current selection of two input images by another input image to thereby change the baseline/disparity. For example, referring to FIG. 3, when the input images $IMG_3$ and $IMG_4$ are currently used for setting the left-view image and the right-view image for 3D playback, the input image $IMG_4$ may be replaced by the input image $IMG_2$, $IMG_3$ or $IMG_5$ due to the user interaction input USER_IN, such that the right-view image is updated to change the baseline/disparity. Alternatively, when the input images $IMG_3$ and $IMG_4$ are currently used for setting the left-view image and the right-view image for 3D playback, the input image $IMG_3$ may be replaced by the input image $IMG_1$, $IMG_2$ or $IMG_4$ due to the user interaction input USER_IN, such that the left-view image is updated to change the baseline/disparity.

When the user interaction input USER_IN is to control the zoom in/zoom out with disparity control, the user interaction processing apparatus 106 has to resize the input images. Hence, the disparity associated with the input images would be adjusted accordingly. To avoid the disparity from being changed significantly, the image selection unit 232 may change the selection of one of the two input images, and/or the image cropping unit 236 may obtain one partial image according to a different local region in one of the two input images.

In addition to aforementioned image processing operations, the user interaction processing apparatus 106 may further apply other online image processing operations for image enhancement. For example, the output unit 238 may perform an enhanced image processing operation for foreground sharpening and background blurring; perform an enhanced image processing operation for enhancing edges for 3D MAV/panorama; perform an enhanced image processing operation for enhancing details for high dynamic range (HDR) MAV/panorama; and/or perform an enhanced image processing operation for depth boundary sharpening for 3D visual effect enhancement. Besides, the image selection unit 232 may perform an enhanced image processing operation for controlling the disparity within a visual comfortable zone to achieve true auto convergence.

Regarding the image viewing system 100 shown in FIG. 1, the image alignment analysis unit 224 is configured to perform the local image alignment analysis, and the image warping unit 236 is configured to perform the local image warping operation. In an alternative design, the image viewing system 100 may be modified to perform global image alignment analysis and global image warping operation. Please refer to FIG. 4, which is a block diagram illustrating an image viewing system according to a second embodiment of the present invention. The image viewing system 400 may be implemented in a mobile device such as a cellular phone. In this embodiment, the motion analysis apparatus 404 includes an image alignment analysis unit 424, an image warping unit 434, and the aforementioned motion information acquisition unit 222. The user interaction processing apparatus 406 includes an image selection unit 432, and the aforementioned user input receiving unit 231, image cropping unit 236 and output unit 238. The image alignment analysis unit 424 is implemented for performing a global image alignment analysis upon the input images IMG_IN to obtain image alignment information $INF_a$. In this embodiment, the image alignment analysis unit 424 may perform the global image alignment analysis by using motion estimation or homography transformation. As the alignment information associated with the whole image area of each input image is obtained by the global image alignment analysis, the following image processing stage is thus allowed to employ a global image processing scheme. For example, a global image warping operation may be performed in accordance with the global image alignment analysis result carried via the image alignment information $INF_a$. Therefore, the image warping unit 434 in this embodiment is arranged for performing the global image warping operation (i.e., an offline image warping operation) upon each of the input images IMG_IN in the analysis phase, and accordingly generating a plurality of warped input images IMG_IN' for further processing.

In this embodiment, the storage apparatus 105 is used to store the image information (i.e., the warped input images IMG_IN') and the auxiliary information (e.g., the image alignment information $INF_a$). By way of example, a multi-picture object (MPO) container may be employed to store multiple images and respective auxiliary information. Hence, the following user interaction processing apparatus 406 can obtain the desired data from the storage apparatus 105.

The difference between the image selection units 232 and 432 is that the image selection unit 432 determines a selected image from the warped input images IMG_IN' for 2D playback according to the user interaction input USER_IN and the image alignment information $INF_a$ (which carries the global image alignment analysis result), and determines two selected images from the warped input images IMG_IN' for 3D playback according to the user interaction input USER_IN and the image alignment information $INF_a$ (which carries the global image alignment analysis result).

Figure 4:
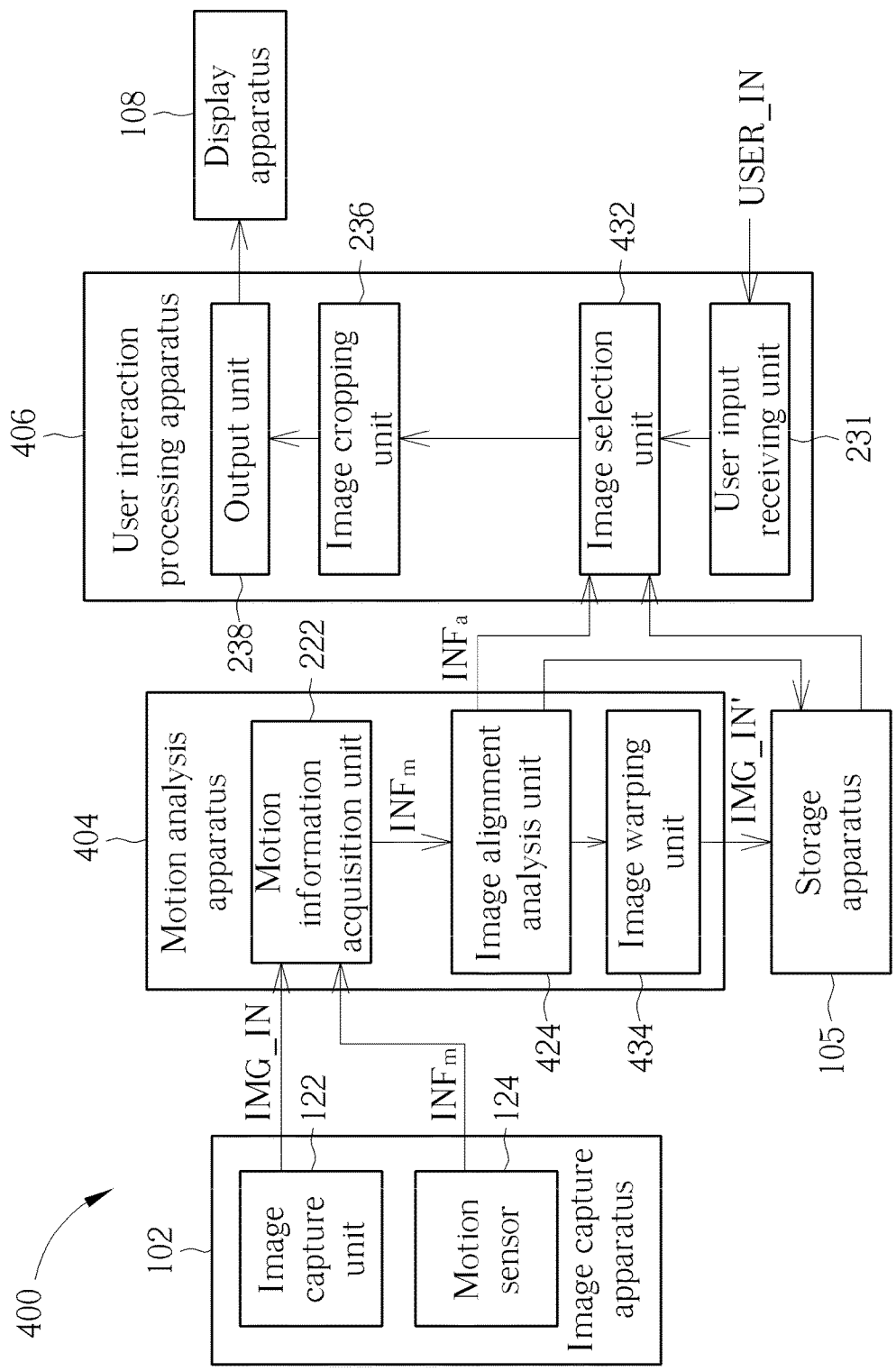
FIG. 4 is a block diagram illustrating an image viewing system according to a second embodiment of the present invention.

As a person skilled in the art can readily understand function and operation of each component shown in FIG. 4 after reading above paragraphs, further description is omitted here for brevity.

In yet another embodiment of the present invention, the global image alignment analysis and the local image alignment analysis may be both performed, thus allowing the following image processing stages to employ global image processing scheme as well as local image processing scheme. Please refer to FIG. 5, which is a block diagram illustrating an image viewing system according to a third embodiment of the present invention. The image viewing system 500 may be implemented in a mobile device such as a cellular phone. In this embodiment, the motion analysis apparatus 504 includes an image alignment analysis unit 524 and the aforementioned image warping unit 434 and motion information acquisition unit 222. The user interaction processing apparatus 506 includes an image selection unit 532 and the aforementioned user input receiving unit 231, image warping unit 234, image cropping unit 236 and output unit 238. The image alignment analysis unit 524 in this embodiment is implemented for performing an image alignment analysis upon the input images IMG_IN to obtain image alignment information $INF_a$. More specifically, the image alignment analysis unit 424 is designed to perform a local image alignment analysis (e.g., object-based alignment or deformable transformation) and/or a global image alignment analysis (e.g., similarity or homography transformation). Thus, the image alignment information $INF_a$ would include information derived from the local image alignment analysis and information derived from global image alignment analysis. The information derived from global image alignment analysis may be used by the image warping unit 434, and the information derived from the local image alignment analysis may be used by the image selection unit 532 and image warping unit 234. As the global image warping and the local image warping are both performed in this embodiment, the visual quality can be enhanced greatly.

The difference between the image selection units 532 and 432 is that the image selection unit 532 determines a selected image from the warped input images IMG_IN' for 2D playback according to the user interaction input USER_IN and the local image alignment analysis result carried via the image alignment information $INF_a$, and determines two selected images from the warped input images IMG_IN' for 3D playback according to the user interaction input USER_IN and the local image alignment analysis result carried via the image alignment information $INF_a$.

Figure 5:
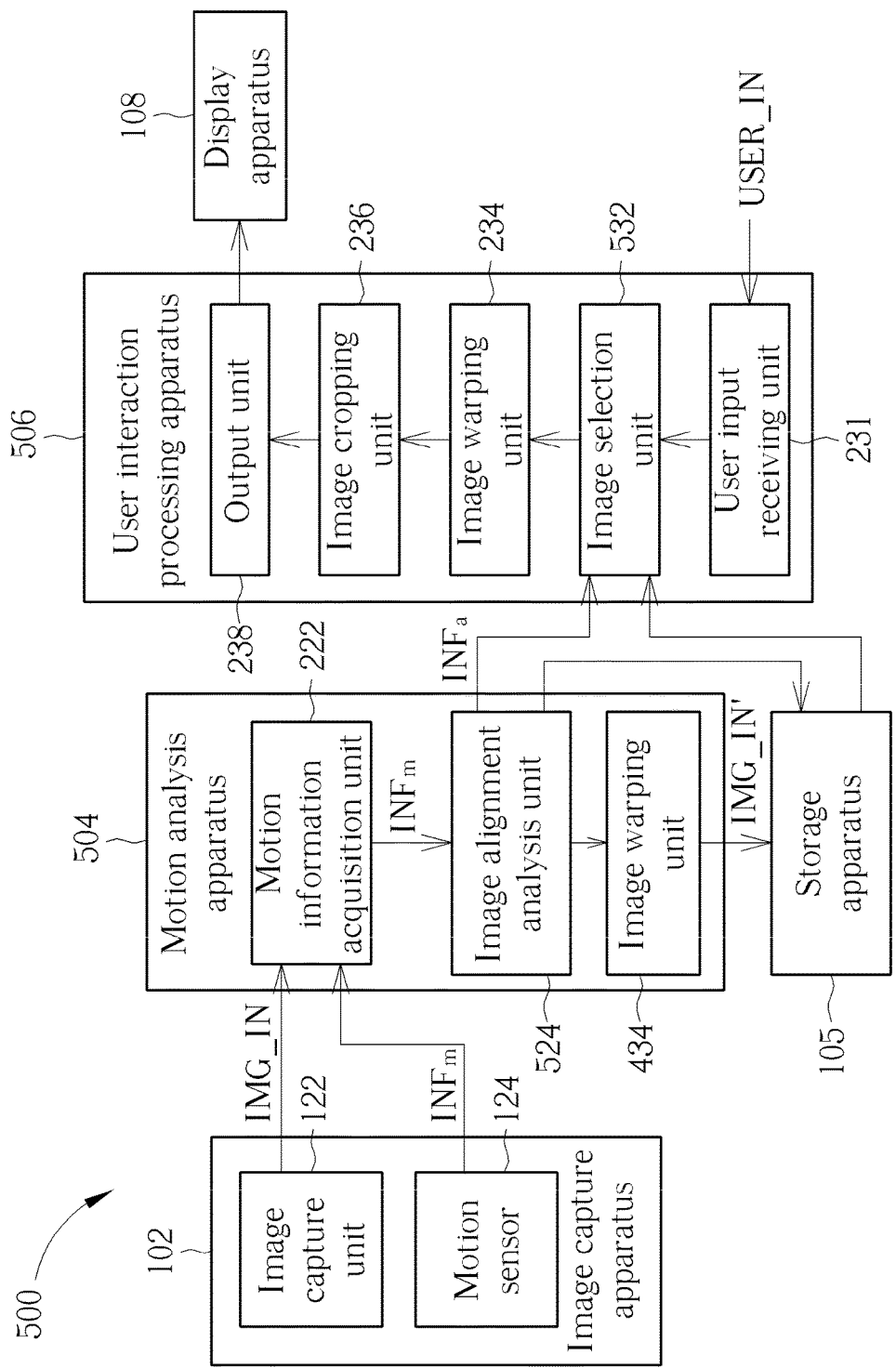
FIG. 5 is a block diagram illustrating an image viewing system according to a third embodiment of the present invention.

As a person skilled in the art can readily understand function and operation of each component shown in FIG. 5 after reading above paragraphs, further description is omitted here for brevity.

Figure 6:
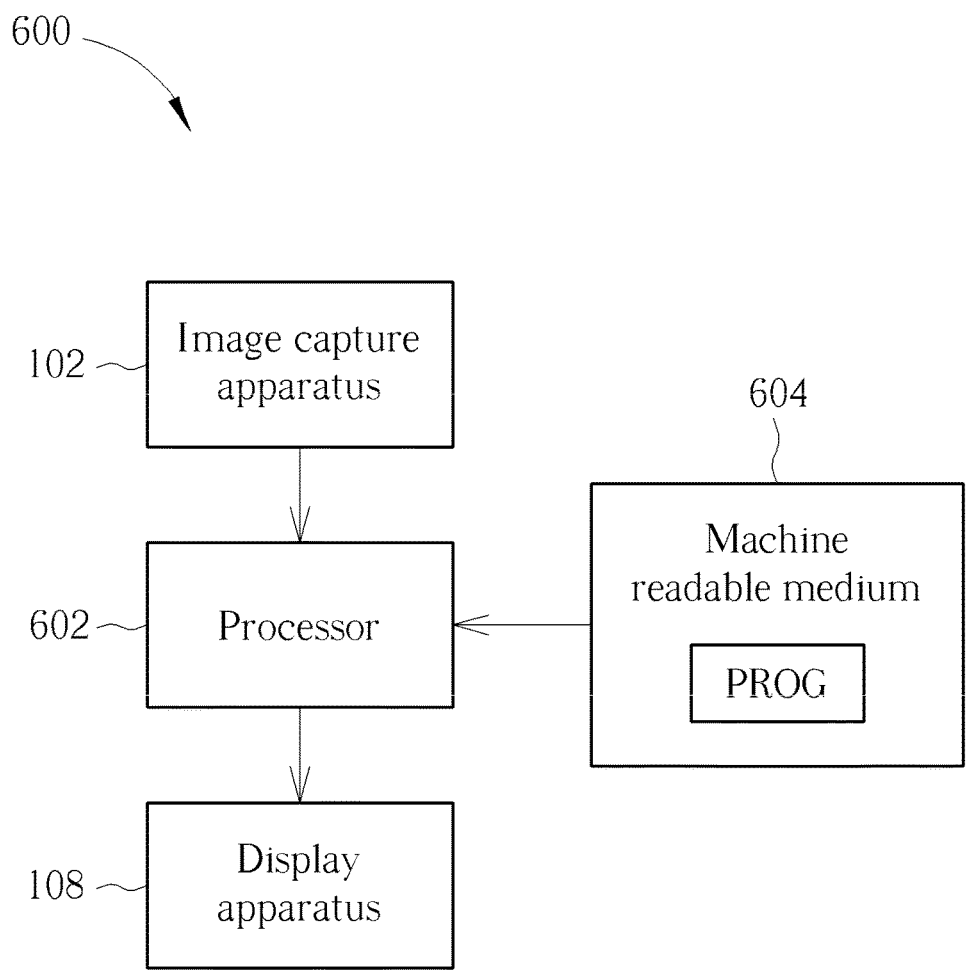
FIG. 6 is a block diagram illustrating an image viewing system according to a fourth embodiment of the present invention.

The aforementioned image viewing system 100/400/500 may be realized using pure hardware. Alternatively, at least a portion (i.e., part or all) of the aforementioned image viewing system 100/400/500 may be realized using a software-based implementation. Please refer to FIG. 6, which is a block diagram illustrating an image viewing system according to a fourth embodiment of the present invention. The image viewing system 600 may be implemented in a mobile device such as a cellular phone. As shown in FIG. 6, the image viewing system 600 includes a processor 602, a machine readable medium 604, and the aforementioned image capture apparatus 102 and display apparatus 108. The machine readable medium 604 may be a memory device such as a non-volatile memory. The machine readable medium 604 acts as the storage apparatus 105, and further stores a program code PROG (e.g., firmware of the mobile device). When loaded and executed by the processor 602, the program code PROG instructs the processor 602 to perform operations of aforementioned motion analysis apparatus 104/404/504 and user interaction processing apparatus 106/406/506. Hence, the same objective of providing a user interactive multi-image quick viewer is achieved. As a person skilled in the art can readily understand details of the image viewing system 600 after reading above paragraphs, further description is omitted here for brevity.

Regarding the image viewing system 600 shown in FIG. 6, the processor 602 executes the program code PROG to realize the motion analysis apparatus 104/404/504 and user interaction processing apparatus 106/406/506. However, this is for illustrative purposes only, and is not meant to be a limitation of the present invention. In an alternative design, at least one of the components within the motion analysis apparatus 104/404/504 and user interaction processing apparatus 106/406/506 may be implemented using pure hardware, and the rest of the components within the motion analysis apparatus 104/404/504 and user interaction processing apparatus 106/406/506 may be implemented using the processor 602 executing the program code PROG. For example, the image viewing system 600 may be modified to have the image alignment analysis unit 224/424/524 implemented using pure hardware. This also belongs to the scope of the present invention.

The kernel features of an image viewing method employed by the image viewing system 100/400/500/600 may be briefly summarized as having at least the following steps: determining at least a first partial image corresponding to a portion of a first image directly selected from a plurality of images, and driving a display apparatus according to the first partial image; in accordance with a user interaction input, determining a second partial image corresponding to a portion of a second image directly selected from the images; and driving the display apparatus according to at least the second partial image. The first image and the second image are spatially correlated, and a field of view (FOV) of each of the first image and the second image is larger than an FOV of the display apparatus.

In summary, the proposed image viewing system and method allow a user to manually select any desired local area within the entire high-resolution/high-FOV images and see the desired local area on a low-resolution/low-FOV display screen, where the images are not merged/combined into one single image to thereby preserve all of the image geometry and photometry information. In this way, the user can feel like manipulating a single image on the user interface that automatically switches between different images in response to the user interaction. Besides, an artifact-free image output is presented on the display screen by the proposed simple and effective user interactive multi-image quick viewer realized using the proposed image viewing system 100/400/500/600.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image viewing method, comprising:
   generating a plurality of images, each image of the plurality of images having a corresponding unique viewing angle;
   storing the plurality of images individually in a storage apparatus, wherein the plurality of images stored in the storage apparatus are not merged into a single image, and all of information of the plurality of images is preserved;
   determining at least a first partial image corresponding to a portion of a first image directly selected from the plurality of images, and driving a display apparatus to display the first partial image;
   in accordance with a user interaction input by touching or dragging action on a touch panel to select the portion of the first image, determining a second partial image corresponding to a portion of a second image directly selected from the plurality of images, wherein the step of determining the second partial image comprises:
      referring to the same user interaction input to find a plurality of candidate images from the plurality of images, wherein the first image and the plurality of candidate images are spatially correlated, and each of the plurality of candidate images has a candidate portion pointed to by the same user interaction input; and
      performing comparison based on candidate portions of the plurality of candidate images to select one of the plurality of candidate images as the second image, wherein the comparison is referring to differences between the portion of the first image and the candidate portions of the plurality of candidate images to select one of the plurality of candidate images as the second image and a candidate image with a smallest difference between a candidate portion and the portion of the first image is selected as the second image; and
   driving the display apparatus to display at least the second partial image, wherein the first partial image is displayed on the display apparatus before the second partial image is determined and displayed in response to the same user interaction input, the first image and the second image are spatially correlated, and a field of view (FOV) of each of the first image and the second image is larger than an FOV of the display apparatus.

2. The image viewing method of claim 1, wherein when the first image is an image initially selected from the plurality of images, the first image is determined automatically without user intervention.

3. The image viewing method of claim 1, further comprising:
   referring to positions of the candidate portions of the plurality of candidate images to select one of the plurality of candidate images as the second image.

4. The image viewing method of claim 3, wherein a candidate image with a candidate portion closest to an image center is selected as the second image.

5. The image viewing method of claim 1, wherein the step of determining the second partial image comprises:
   performing a local image warping operation upon the portion of the second image to generate a warped portion of the second image; and
   determining the second partial image according to the warped portion of the second image.

6. The image viewing method of claim 5, further comprising:

performing a local image alignment analysis upon the plurality of images to obtain image alignment information;

wherein the local image warping operation is performed by referring to the image alignment information.

7. The image viewing method of claim 6, further comprising:
obtaining motion information of the plurality of images by:
performing a three-dimensional (3D) motion analysis upon the plurality of images;
or receiving an output of a motion sensor located at an image capture apparatus which generates the plurality of images;
wherein the local image alignment analysis is performed by referring to the motion information.

8. The image viewing method of claim 1, further comprising:
generating the plurality of images by performing a global image warping operation upon each of a plurality of input images.

9. The image viewing method of claim 8, further comprising:
performing a global image alignment analysis upon the plurality of images to obtain image alignment information;
wherein the global image warping operation is performed by referring to the image alignment information.

10. The image viewing method of claim 9, further comprising:
obtaining motion information of the plurality of images by:
performing a three-dimensional (3D) motion analysis upon the plurality of images; or
receiving an output of a motion sensor located at an image capture apparatus which generates the plurality of images;
wherein the global image alignment analysis is performed by referring to the motion information.

11. The image viewing method of claim 1, wherein the first partial image and a third partial image corresponding to a portion of a third image directly selected from the plurality of images are displayed on the display apparatus for three-dimensional (3D) playback; the image viewing method further comprising:
in accordance with the same user interaction input, determining a fourth partial image corresponding to a portion of a fourth image directly selected from the plurality of images; and
the step of driving the display apparatus according to at least the second partial image comprises driving the display apparatus according to the second partial image and the fourth partial image for 3D playback, where the third image and the fourth image are spatially correlated, and an FOV of each of the third image and the fourth image is larger than the FOV of the display apparatus.

12. The image viewing method of claim 1, wherein a display output of the display apparatus is switched from the first partial image to the second partial image in response to the same user interaction input.

13. An image viewing system, comprising:
an image capture apparatus generating a plurality of images, each image of the plurality of images having a corresponding unique viewing angle;
a storage apparatus storing the plurality of images individually, wherein the plurality of images stored in the storage apparatus are not merged into a single image, and all of information of the plurality of images is preserved;
an output circuit driving a display apparatus to display a first partial image corresponding to a portion of a first image directly selected from the plurality of images;
a user input receiving circuit receiving a user interaction input by touching or dragging action on a touch panel to select the portion of the first image;
an image selection circuit directly selecting a second image from the plurality of images according to the same user interaction input, wherein the image selection circuit refers to the same user interaction input to find a plurality of candidate images from the plurality of images, where the first image and the plurality of candidate images are spatially correlated, and each of the plurality of candidate images has a candidate portion pointed to by the same user interaction input; and the image selection circuit performing comparison based on candidate portions of the plurality of candidate images to select one of the plurality of candidate images as the second image, wherein the comparison is referring to differences between the portion of the first image and the candidate portions of the plurality of candidate images to select one of the plurality of candidate images as the second image and a candidate image with a smallest difference between a candidate portion and the portion of the first image is selected as the second image;
an image cropping circuit determining a second partial image corresponding to a portion of the second image according to the same user interaction input;
wherein the output circuit is further driving the display apparatus to display at least the second partial image, the first partial image is displayed on the display apparatus before the second partial image is determined and displayed in response to the same user interaction input, the first image and the second image are spatially correlated, and a field of view (FOV) of each of the first image and the second image is larger than an FOV of the display apparatus.

14. The image viewing system of claim 13, wherein when the first image is an image initially selected from the plurality of images, the first image is determined by the image selection circuit automatically without user intervention.

15. The image viewing system of claim 13, wherein the image selection circuit refers to positions of the candidate portions of the plurality of candidate images to select one of the plurality of candidate images as the second image.

16. The image viewing system of claim 15, wherein a candidate image with a candidate portion closest to an image center is selected by the image selection circuit as the second image.

17. The image viewing system of claim 13, further comprising:
an image warping circuit performing a local image warping operation upon the portion of the second image to generate a warped portion of the second image;
wherein the image cropping circuit determines the second partial image according to the warped portion of the second image.

18. The image viewing system of claim 17, further comprising:
an image alignment analysis circuit performing a local image alignment analysis upon the plurality of images to obtain image alignment information;

wherein the image warping circuit performs the local image warping operation by referring to the image alignment information.

19. The image viewing system of claim 18, further comprising:
a motion information acquisition circuit obtaining motion information of the plurality of images by:
performing a three-dimensional (3D) motion analysis upon the plurality of images; or
receiving an output of a motion sensor located at an image capture apparatus which generates the plurality of images;
wherein the image alignment analysis circuit performs the local image alignment analysis by referring to the motion information.

20. The image viewing system of claim 13, further comprising:
an image warping circuit generating the images by performing a global image warping operation upon each of a plurality of input images.

21. The image viewing system of claim 20, further comprising:
an image alignment analysis circuit performing a global image alignment analysis upon the plurality of images to obtain image alignment information;
wherein the image warping circuit performs the global image warping operation by referring to the image alignment information.

22. The image viewing system of claim 21, further comprising:
a motion information acquisition circuit obtaining motion information of the plurality of images by:
performing a three-dimensional (3D) motion analysis upon the plurality of images; or
receiving an output of a motion sensor located at the image capture apparatus which generates the plurality of images;
wherein the image alignment analysis circuit performs the global image alignment analysis by referring to the motion information.

23. The image viewing system of claim 13, wherein the first partial image and a third partial image corresponding to a portion of a third image directly selected from the plurality of images are displayed on the display apparatus for three-dimensional (3D) playback; the image selection circuit further directly selects a fourth image from the plurality of images according to the same user interaction input; the image cropping circuit further determines a fourth partial image corresponding to a portion of the fourth image according to the same user interaction input; the output circuit drives the display apparatus according to the second partial image and the fourth partial image for 3D playback; the third image and the fourth image are spatially correlated; and an FOV of each of the third image and the fourth image is larger than the FOV of the display apparatus.

24. The image viewing system of claim 13, wherein a display output of the display apparatus is switched from the first partial image to the second partial image in response to the same user interaction input.

25. A non-transitory machine readable medium storing a program code, wherein when executed by a processor, the program code instructs the processor to perform the following steps:
generating a plurality of images with an image capture apparatus, each image of the plurality of images having a corresponding unique viewing angle;
storing the plurality of images individually in a storage apparatus, wherein the plurality of images stored in the storage apparatus are not merged into a single image, and all of information of the plurality of images is preserved;
determining at least a first partial image corresponding to a portion of a first image directly selected from the plurality of images, and driving a display apparatus to display the first partial image;
in accordance with a user interaction input by touching or dragging action on a touch panel to select the portion of the first image, determining a second partial image corresponding to a portion of a second image directly selected from the plurality of images, wherein the step of determining the second partial image comprises:
referring to the same user interaction input to find a plurality of candidate images from the plurality of images, wherein the first image and the plurality of candidate images are spatially correlated, and each of the plurality of candidate images has a candidate portion pointed to by the same user interaction input; and
performing comparison based on candidate portions of the plurality of candidate images to select one of the plurality of candidate images as the second image, wherein the comparison is referring to differences between the portion of the first image and the candidate portions of the plurality of candidate images to select one of the plurality of candidate images as the second image and a candidate image with a smallest difference between a candidate portion and the portion of the first image is selected as the second image; and
driving the display apparatus to display at least the second partial image, wherein the first partial image is displayed on the display apparatus before the second partial image is determined and displayed in response to the same user interaction input, the first image and the second image are spatially correlated, and a field of view (FOV) of each of the first image and the second image is larger than an FOV of the display apparatus.

26. The non-transitory machine readable medium of claim 25, wherein a display output of the display apparatus is switched from the first partial image to the second partial image in response to the same user interaction input.

* * * * *